(12) United States Patent
Ozkan et al.

(10) Patent No.: US 7,032,236 B1
(45) Date of Patent: Apr. 18, 2006

(54) MULTIMEDIA SYSTEM FOR PROCESSING PROGRAM GUIDES AND ASSOCIATED MULTIMEDIA OBJECTS

(75) Inventors: Mehmet Kemal Ozkan, Istanbul (TR); Chia-Yuan Teng, San Diego, CA (US); Edwin Arturo Heredia, San Jose, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/622,329

(22) PCT Filed: Feb. 18, 1999

(86) PCT No.: PCT/US99/03511

§ 371 (c)(1),
(2), (4) Date: Feb. 26, 2001

(87) PCT Pub. No.: WO99/43158

PCT Pub. Date: Aug. 26, 1999

Related U.S. Application Data

(60) Provisional application No. 60/075,412, filed on Feb. 20, 1998.

(51) Int. Cl.
*H04N 5/445* (2006.01)
*H04N 7/173* (2006.01)

(52) U.S. Cl. .................... 725/39; 725/50; 725/132; 725/140; 725/152

(58) Field of Classification Search ............... 725/39, 725/44, 45, 50, 40, 132, 140, 152
See application file for complete search history.

(56) References Cited

U.S. PATENT DOCUMENTS

| | | | | |
|---|---|---|---|---|
| 5,563,648 A | * | 10/1996 | Menand et al. | 725/142 |
| 5,734,589 A | * | 3/1998 | Kostreski et al. | 345/716 |
| 5,973,681 A | * | 10/1999 | Tanigawa et al. | 345/716 |
| 6,064,378 A | * | 5/2000 | Chaney et al. | 725/39 |
| 6,118,445 A | * | 9/2000 | Nonomura et al. | 345/723 |
| 6,157,411 A | * | 12/2000 | Williams et al. | 348/552 |

(Continued)

FOREIGN PATENT DOCUMENTS

CN 1164947 A 11/1997

(Continued)

OTHER PUBLICATIONS

Technical Journal "Fernseh-und Kino-Technik", pp. 620-630, vol. 51, No. Oct. 1997.

(Continued)

*Primary Examiner*—Christopher Grant
*Assistant Examiner*—Son P. Huynh
(74) *Attorney, Agent, or Firm*—Joseph J. Laks; Ronald H. Kurdyla; Jeffrey M. Navon

(57) ABSTRACT

A program guide information data structure and processing system facilitates both decoding and selectable program guide generation by a decoder. A decoder acquires a directory of object files associated with program guide information items and a map for associating the object files (e.g. representing channel, program or control information or software) with the program guide information items. The decoder creates an image object from an object file and links the image object to a program guide information item. The decoder executes an application software object to form a special program guide for display and executes another application software object to command a device in processing a program listed in a program guide.

15 Claims, 11 Drawing Sheets

U.S. PATENT DOCUMENTS

| | | | | |
|---|---|---|---|---|
| 6,160,545 | A  * | 12/2000 | Eyer et al. | 345/721 |
| 6,177,930 | B1 * | 1/2001 | Chernock et al. | 345/716 |
| 6,357,043 | B1 * | 3/2002 | Ellis et al. | 725/61 |
| 6,414,720 | B1 * | 7/2002 | Tsukidate et al. | 348/469 |
| 6,519,009 | B1 * | 2/2003 | Hanaya et al. | 348/564 |
| 6,583,825 | B1 * | 6/2003 | Yuen et al. | 348/731 |
| 6,701,524 | B1 * | 3/2004 | Okamura et al. | 725/37 |

FOREIGN PATENT DOCUMENTS

| | | |
|---|---|---|
| DE | 3815071 C2 | 1/1990 |
| WO | 97/02702 | 1/1997 |
| WO | 97/30549 | 8/1997 |

OTHER PUBLICATIONS

Translation of: Technical Journal "Fernseh-und Kino-Technik", pp. 620-630, vol. 51, No. Oct. 1997.

Technical Journal Radio-Fernsehen-Elektronik (RFE), 9 and 10, 1996 pp. 28-31 and 38-39, and supplementary section, which was printed on an advertising page.

Translation of: Technical Journal Radio-Fernsehen-Elektronik (RFE) 9 and 10, 1996, pp. 28-31 and 38-39, and supplementary section, which was printed on an advertising page.

Gerhard Eitz, Future Information and Data Offers in Digital Television—EPG and "Bookmarks", Manuscript Data services for digital television, 14 pages total.

F. Colaitis et al MHEG and Its Profile for ITV Applications, IEE Colloquium on Interactive Television, No. 1995/159, Oct. 2, 1995, pp. 3/1-3/08.

K. Hofrichter MHEG 5-Standardized Presentation Objects for the Set Top Unit Environment, Interactive Distributed Multimedia Systems and Services, Mar. 4, 1996, pp. 33-44.

* cited by examiner

| SYNTAX | BITS | FORMAT |
|---|---|---|
| master_guide_table_section () { | | |
|     table_id | 8 | 0x91 |
|     section_syntax_indicator | 1 | '1' |
|     private_indicator | 1 | '1' |
|     reserved | 2 | '11' |
|     section_length | 12 | uimsbf |
|     network_provider | 16 | uimsbf |
|     reserved | 2 | '11' |
|     version_number | 5 | uimsbf |
|     current_next_indicator | 1 | '1' |
|     section_number | 8 | 0x00 |
|     last_section_number | 8 | 0x00 |
|     protocol_version | 8 | uimsbf |
|     number_networks_defined | 16 | uimsbf |
|     table_types_defined | 16 | uimsbf |
|     for (i=0;<table_types_defined;i++){ | | |
|         table_type | 16 | uimsbf |
|         reserved | 3 | '111' |
|         table_type_PID | 13 | uimsbf |
|         reserved | 3 | '111' |
|         table_type_version_number | 5 | uimsbf |
|         number_bytes | 32 | uimsbf |
|         reserved | 4 | '1111' |
|         table_type_descriptors_length | 12 | uimsbf |
|         for (k=0;k<N;k++) | | |
|             descriptor() | var | |
|     } | | |
|     reserved | 4 | '1111' |
|     descriptors_length | 12 | uimsbf |
|     for (l = 0;l<N;l++) | | |
|         descriptor() | var | |
|     CRC_32 | 32 | rpchof |
| } | | |

FIG. 2

| SYNTAX | BITS | FORMAT |
|---|---|---|
| terrestrial_channel_information_table_section () { | | |
|   table_id | 8 | 0x95 |
|   section_syntax_indicator | 1 | '1' |
|   private_indicator | 1 | '1' |
|   reserved | 2 | '11' |
|   section_length | 12 | uimsbf |
|   network_provider | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=0;i<num_channels_in_section;i++){ | | |
|     short name | 7*16 | unicode BMP |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     access_controlled | 1 | bslbf |
|     hidden | 1 | bslbf |
|     reserved | 8 | 0xFF |
|     service_type | 6 | uimsbf |
|     source_id | 16 | uimsbf |
|     carouselId | 32 | uimsbf |
|     reserved | 6 | '111111' |
|     descriptors_length | 10 | uimsbf |
|     for (i=0;i<N;i++) { | | |
|       descriptors() | | |
|     } | | |
|   } | | |
|   reserved | 6 | '111111' |
|   additional_descriptors_length | 10 | uimsbf |
|   for(j=0;j<N;j++) { | | |
|     additional_descriptors() | | |
|   } | | |
|   CRC_32 | 32 | rpchof |
| } | | |

| SYNTAX | BITS | FORMAT |
|---|---|---|
| multimedia_object_section () { | | |
|     table_id | 8 | 0x3C |
|     section_syntax_indicator | 1 | '1' |
|     private_indicator | 1 | '1' |
|     reserved | 2 | '11' |
|     section_length | 12 | uimsbf |
|     moduleId | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocolDiscriminator | 8 | uimsbf |
|     dsmccType | 8 | 0x11 |
|     messageId | 8 | 0x03 |
|     carouselId | 16 | 0x1003 |
|     reserved | 32 | uimsbf |
|     adaptionLength | 8 | 0xFF |
|     messageLength | 8 | 0x00 |
|     moduleId | 16 | uimsbf |
|     moduleVersion | 16 | uimsbf |
|     reserved | 8 | uimsbf |
|     blockNumber | 8 | 0xFF |
|     Object_data ( ) | 16 | uimsbf |
|     CRC_32 | | |
| } | 32 | rpchof |

| SYNTAX | BITS | FORMAT |
|---|---|---|
| channel_basic_information_file_section () { | | |
|     table_id | 8 | 0x3C |
|     section_syntax_indicator | 1 | '1' |
|     private_indicator | 1 | '1' |
|     reserved | 2 | '11' |
|     section_length | 12 | uimsbf |
|     moduleId | 16 | 0x0001 |
|     reserved | 2 | '11' |
|     version_number | 5 | uimsbf |
|     current_next_indicator | 1 | '1' |
|     section_number | 8 | 0x00 |
|     last_section_number | 8 | 0x00 |
|     protocolDiscriminator | 8 | 0x11 |
|     dsmccType | 8 | 0x03 |
|     messageId | 16 | 0x1003 |
|     carouselId | 32 | uimsbf |
|     reserved | 8 | 0xFF |
|     adaptionLength | 8 | 0x00 |
|     messageLength | 16 | uimsbf |
|     moduleId | 16 | 0x0001 |
|     moduleVersion | 8 | uimsbf |
|     reserved | 8 | 0xFF |
|     blockNumber | 16 | 0x0000 |
|     number_modules | 16 | uimsbf |
|     for (i=0;i<number_modules;i++){ | | |
|         moduleId | 16 | uimsbf |
|         number_blocks | 16 | uimsbf |
|         reserved | 4 | '1111' |
|         moduleSize | 28 | uimsbf |
|         moduleVersion | 8 | uimsbf |
|     } | | |
|     reserved | 4 | '1111' |
|     descriptors_length | 12 | |
|     for (i=0;i<N;i++) { | | |
|         descriptor() | | |
|     } | | |
|     CRC_32 | 32 | rpchof |
| } | | |

FIG. 5

| SYNTAX | BITS | FORMAT |
|---|---|---|
| event_basic_information_file_section () { | | |
|     table_id | 8 | 0x3C |
|     section_syntax_indicator | 1 | '1' |
|     private_indicator | 1 | '1' |
|     reserved | 2 | '11' |
|     section_length | 12 | uimsbf |
|     moduleId | 16 | 0x0002 |
|     reserved | 2 | '11' |
|     version_number | 5 | uimsbf |
|     current_next_indicator | 1 | '1' |
|     section_number | 8 | 0x00 |
|     last_section_number | 8 | 0x00 |
|     protocolDiscriminator | 8 | 0x11 |
|     dsmccType | 8 | 0x03 |
|     messageId | 16 | 0x1003 |
|     carouselId | 32 | uimsbf |
|     reserved | 8 | 0xFF |
|     adaptionLength | 8 | 0x00 |
|     messageLength | 16 | uimsbf |
|     moduleId | 16 | 0x0002 |
|     moduleVersion | 8 | uimsbf |
|     reserved | 8 | 0xFF |
|     blockNumber | 16 | 0x0000 |
|     title_length | 8 | uimsbf |
|     title_text() | var | |
|     number_modules | 16 | uimsbf |
|     for (i=0;i<number_modules;i++) { | | |
|         moduleId | 16 | uimsbf |
|         number_blocks | 16 | uimsbf |
|         reserved | 4 | '1111' |
|         moduleSize | 28 | uimsbf |
|         moduleVersion | 8 | uimsbf |
|     } | | |
|     reserved | 4 | '1111' |
|     descriptors_length | 12 | |
|     for (i=0;i<N;i++) { | | |
|         descriptor() | | |
|     } | | |
|     CRC_32 | 32 | rpchof |
| } | | |

FIG. 6

| SYNTAX | BITS | FORMAT |
|---|---|---|
| control_basic_information_file_section () { | | |
|     table_id | 8 | 0x3C |
|     section_syntax_indicator | 1 | '1' |
|     private_indicator | 1 | '1' |
|     reserved | 2 | '11' |
|     section_length | 12 | uimsbf |
|     moduleId | 16 | 0x0003 |
|     reserved | 2 | '11' |
|     version_number | 5 | uimsbf |
|     current_next_indicator | 1 | '1' |
|     section_number | 8 | 0x0000 |
|     last_section_number | 8 | 0x0000 |
|     protocolDiscriminator | 8 | 0x11 |
|     dsmccType | 8 | 0x03 |
|     messageId | 16 | 0x1003 |
|     carouselId | 32 | uimsbf |
|     reserved | 8 | 0xFF |
|     adaptionLength | 8 | 0x00 |
|     messageLength | 16 | uimsbf |
|     moduleId | 16 | 0x0003 |
|     moduleVersion | 8 | uimsbf |
|     reserved | 8 | 0xFF |
|     blockNumber | 16 | 0x0000 |
|     number_modules | 16 | uimsbf |
|     for (i=0;i<number_modules;i++) { | | |
|         moduleId | 16 | uimsbf |
|         number_blocks | 16 | uimsbf |
|         reserved | 4 | '1111' |
|         moduleSize | 28 | uimsbf |
|         moduleVersion | 8 | uimsbf |
|     } | | |
|     reserved | 4 | '1111' |
|     descriptors_length | 12 | |
|     for (i=0;i<N;i++) { | | |
|         descriptor() | | |
|     } | | |
|     CRC_32 | 32 | rpchof |
| } | | |

FIG. 7

| | MSB | | | LSB | |
|---|---|---|---|---|---|
| Bit | 31 | 24 | 23 | 16 | 15 | 0 |
| carouselId | time | area | dirNumber |

FIG. 8

| SYNTAX | BITS | FORMAT |
|---|---|---|
| master_database_table_section () { | | |
|     table_id | 8 | 0x92 |
|     section_syntax_indicator | 1 | '1' |
|     private_indicator | 1 | '1' |
|     reserved | 2 | '11' |
|     section_length | 12 | uimsbf |
|     table_id_extension | 16 | 0x0000 |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     number_cells_defined | 24 | uimsbf |
|     number_cells_in_section | 24 | uimsbf |
|     for (i=0;i<number_cells_in_section;i++) { | | |
|         cell_type | 24 | uimsbf |
|         reserved | 3 | '111' |
|         cell_type_PID | 13 | uimsbf |
|         reserved | 3 | '111' |
|         cell_type_version_number | 5 | uimsbf |
|         number_bytes | 32 | uimsbf |
|         reserved | 4 | '1111' |
|         cell_type_descriptors_length | 12 | uimsbf |
|         for (k=0;k<N;k++) | | |
|             descriptor() | var | |
|     } | | |
|     CRC_32 | 32 | rpchof |
| } | | |

FIG. 9

| | MSB | | LSB |
|---|---|---|---|
| Bit | 23      16 | 15      8 | 7      0 |
| cell_type | time | area | complexity |

FIG. 10

MULTIMEDIA SYSTEM FOR PROCESSING PROGRAM GUIDES AND ASSOCIATED MULTIMEDIA OBJECTS

This application claims the benefit of Provisional Application No. 60/075,412, filed Feb. 20, 1998.

FIELD OF THE INVENTION

This invention is related to the field of digital signal processing, and more particularly to program guides for channels and programs.

BACKGROUND OF THE INVENTION

The formation and processing of large program guides conveying information concerning potentially thousands of broadcast program channels covering a wide geographic area poses a number of problems. The geographic area covered may encompass the whole of the USA or whole continents, for example, and large quantities of information may have to be acquired, collated, encoded and broadcast in a format that facilitates subsequent decoding of the broadcast material. The bandwidth required to process such large quantities of information expands in proportion to the quantity of information being processed. Therefore, there is a need to structure program guide data in order to optimize the use of the available bandwidth.

The degree to which the program guide data structure may be optimized is constrained by the cost of a decoder unit for receiving the structured data. In fact there is a compromise to be made between transmission bandwidth and decoder complexity. At one extreme of the compromise, all duplicative and redundant data elements in the program guide information are eliminated in order to minimize the required transmission and processing bandwidth. As a result, each decoder needs to receive, buffer, parse and collate information from an entire program guide datastream, thereby necessitating a complex and costly decoder.

At the other extreme of the compromise, the program guide information is partitioned into individual sub-sets tailored to the requirements of a particular User or group of Users. This means that each decoder needs to receive, buffer, parse and collate targeted information containing minimal redundancy which facilitates employing a simpler, more economical decoder requiring less processing power. However, such partitioning requires a larger transmission bandwidth to accommodate the increased information redundancy resulting from the need to incorporate duplicate program guide information items in multiple different program guide sub-sets corresponding to different partitions. The problems involved in processing large quantities of program guide information and in achieving a desirable compromise between transmission bandwidth and decoder complexity are addressed by a system according to the present invention. Derivative problems involved in structuring and partitioning program guide data to facilitate both decoding and selectable program guide generation by a decoder are also addressed by a system according to the invention.

SUMMARY OF THE INVENTION

A decoder acquires a directory of object files associated with program guide information items and a map for associating the object files (e.g. representing channel, program or control information or software) with the program guide information items. The decoder creates an image object from an object file and links the image object to a program guide information item. The decoder executes an application software object to form a special program guide for display and executes another application software object to command a device in processing a program listed in a program guide.

BRIEF DESCRIPTION OF THE DRAWINGS

In the drawing:

FIG. 2 shows a Master Guide Table (MGT) format for use in conveying program specific information, according to the invention.

FIG. 3 shows a Channel Information Table (CIT) format for use in conveying program specific information incorporating area based partitioning, according to the invention.

FIG. 4 shows a multimedia object data structure format incorporating area and time based partitioning, according to the invention.

FIGS. 5, 6 and 7 show examples of data structures for channel, event and control object basic information files, according to the invention.

FIG. 8 shows a data structure for an MPEG compatible carouselId (as used in the tables of FIGS. 5, 6 and 7) including identifier fields allowing area and time based partitioning.

FIG. 9 shows a Master Database Table data structure format incorporating hierarchical based version identifiers and cell partition identifiers supporting dynamic program guide re-partitioning, according to the invention.

FIG. 10 shows an exemplary data structure for a cell type indicator (as used in the table of FIG. 9) incorporating area, time and complexity based identifier fields, according to the invention.

DETAILED DESCRIPTION OF THE DRAWINGS

Figure 1:
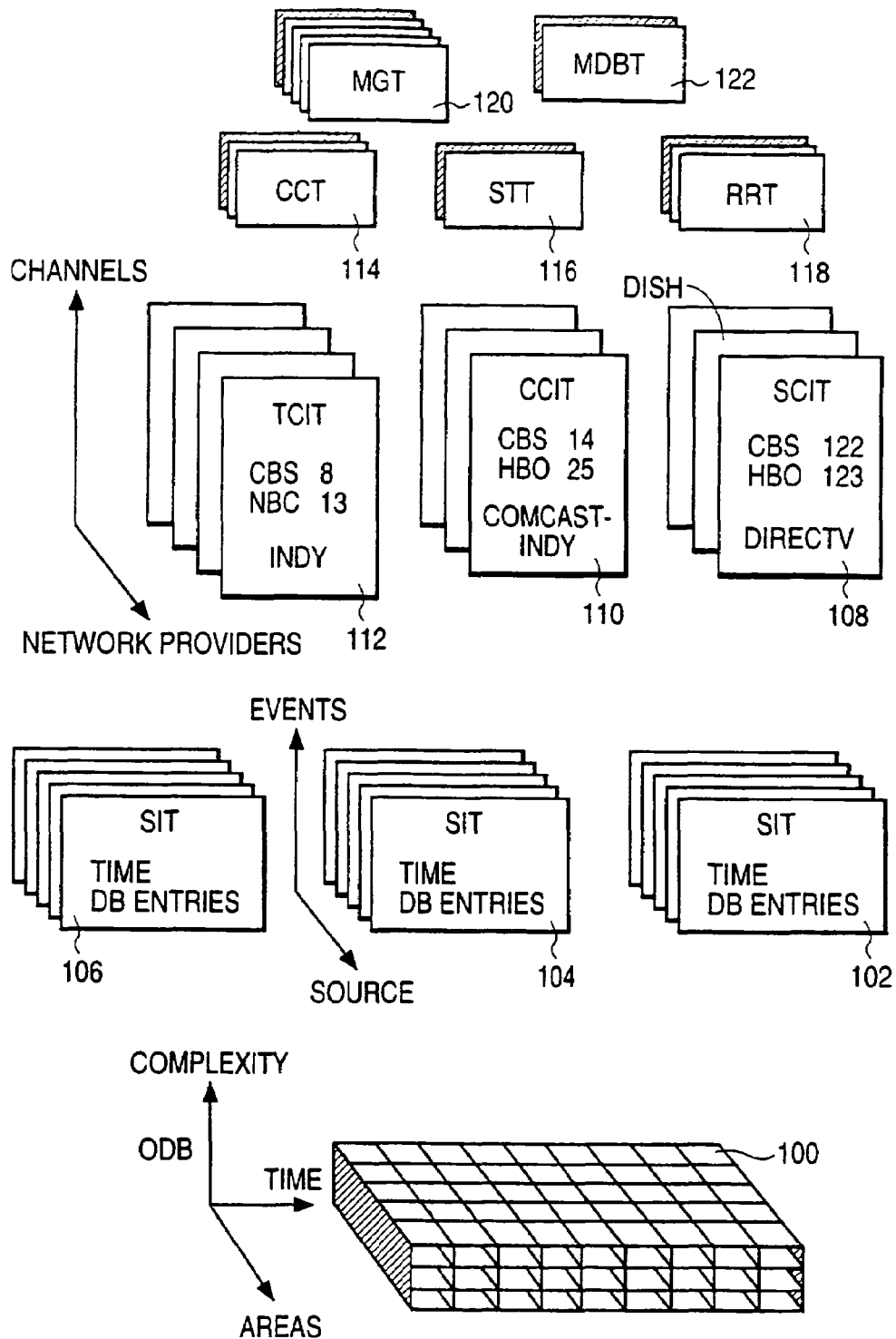
FIG. 1 shows a very large program guide (VLPG) hierarchical file/table format for use in conveying program specific information, according to the invention.

Broadcast programs transmitted in digital format are encoded and broadcast along with ancillary information including program specific information (PSI) used in decoding programs and associated data. Program specific information includes program guide data and information for use in identifying and assembling individual data packets to recover the content of selected program channels. Program specific information and associated program content is advantageously structured to convey large program guides conveying information concerning potentially thousands of broadcast program channels and associated multimedia objects covering a wide geographic area such as whole continents, countries or states, for example. The multimedia objects include audio clips, video clips, animation, still images, Internet data, Email messages, text and other types of data. Multimedia objects are data entities that may be viewed as independent units and are associated with images within individual programs or with program guide components. The multimedia objects are incorporated into composite video images representing a program guide or a video program, for example. The ancillary information data structure supports uni-directional communication applications e.g. passive viewing and bi-directional communication applications e.g. interactive type functions and also supports storage applications.

The program specific information and associated program content may be delivered by different service providers via the Internet in broadcast/multicast mode, or via terrestrial, satellite or cable broadcast on a subscription or other pay per view basis. The data structure facilitates acquisition and decoding of multimedia objects encoded in different data formats and which are communicated in different communication protocols from both local and remote sources.

Hereinafter, data referred to as being MPEG compatible conforms to the MPEG2 (Moving Pictures Expert Group) image encoding standard, termed the "MPEG standard". This standard is comprised of a system encoding section (ISO/IEC 13818-1, 10th Jun. 1994) and a video encoding section (ISO/IEC 13818-2, 20th Jan. 1995).

Data structure elements according to the invention principles may be conveyed in MPEG compatible format (per section 2.4.4 of the MPEG systems standard) or may be conveyed in a format compatible with the *Program and System Information Protocol for Terrestrial Broadcast and Cable*, published by the Advanced Television Systems Committee (ATSC), 10 Nov. 1997, hereinafter referred to as the PSIP standard, or other ATSC standards. Further, the data structure elements may be formed in accordance with other MPEG standards such as the MPEG-4 or MPEG-7 standards or with the proprietary or custom requirements of a particular system.

The principles of the invention may be applied to terrestrial, cable, satellite, Internet or computer network broadcast systems in which the coding type or modulation format may be varied. Such systems may include, for example, non-MPEG compatible systems, involving other types of encoded datastreams and other methods of conveying program specific information. Further, although the disclosed system is described as processing broadcast programs, this is exemplary only. The term 'program' is used to represent any form of packetized data such as audio data, telephone messages, computer programs, Internet data or other communications, for example.

FIG. 1 shows an overview of a very large program guide (VLPG) hierarchical file/table format for use in a transport stream level data structure conveying program specific information. The structure comprises multiple hierarchically arranged and inter-linked tables. The tables consist of arrays of data and parameters which are used to enumerate and describe collections or sequences of TV channels, TV programs, channel parameters, program parameters, associated multimedia objects and object parameters, etc. The exemplary hierarchical table arrangement of FIG. 1 includes a Master Guide Table (MGT) 120, Master Database Table (MDBT) 122, Content and Classification Table (CCT) 114, System Time Table (STT) 116 and Rating Region Table (RRT) 118. The FIG. 1 hierarchy also shows Terrestrial, Cable and Satellite Channel Information Tables (TCIT item 112, CCIT item 110, and SCIT item 108 respectively) in which channel information is collated by network provider e.g. CBS, NBC, HBO, Comcast etc. Additional tables include Schedule Information Tables (SIT 106, SIT 104 and SIT 102) in which programs or services are collated by source.

A MGT contains information for use in acquiring program specific information conveyed in other tables. A channel information table—CIT (e.g. TCIT, CCIT, OR SCIT) contains information for tuning and navigation to receive a User selected program channel. A SIT contains descriptive lists of programs (events) receivable on the channels listed in the CIT. Either a CIT, SIT or other table may be used to convey information enabling a user to select and tune to a particular program. A CIT is typically used to convey parameters for acquiring audiovisual program content data that remains constant over several events (TV programs). An SIT is typically used to convey parameters of audiovisual program content data that remain constant for an event (individual TV program). Additional program specific information describing and supplementing items within the hierarchical tables is conveyed within descriptor information elements.

In order to accommodate data sufficient for a wide area program guide, individual tables in the hierarchy of FIG. 1 are advantageously partitionable by both area (e.g. a geographic, broadcast, or network market area), and scheduled broadcast time. In addition, the table data may be additionally partitioned in accordance with a third parameter such as the complexity level of data or a multimedia object in order to permit scalability in decoding, for example. This type of program guide partitioning is represented by the 3-dimensional cells depicted in diagram 100. In fact, the VLPG structure of FIG. 1 supports virtually any type of partitioning that a guide provider may require. The area and time based partitioning is achieved by including both time and area identifiers in one or more of the tables of FIG. 1 and in associated object data. The advantage of including the area and time partition identifiers in the transport level of the communication protocol in this manner is that it reduces the processing burden (e.g. for parsing the data) on a decoder that otherwise occurs if the partitioning is done at a higher level, say the Application layer level. As a result program guide filtering is done at the transport layer and is performed directly by a transport chip contained in a decoder unit. However, it is possible to include the time and area identifiers for both table data and objects at such a higher level if desired.

In transmitting and processing a program guide, the bandwidth demand grows with the quantity of channel and program information and number of associated objects that need to be transmitted. For a large program guide, even a simple case may require transmission of thousands of items of information and objects. A simple program guide may have neither images, nor audio, nor video clips, but would still need at least text descriptions for the thousands of programs (events) that it carries. It is possible to send the program guide information without redundancy and without partitions in a single bin or data file. In such a case, and in the absence of transport-level partitions, the text descriptions (for example) will end up in a single data file. This means, for example, that a decoder in San Diego will receive all the material (event text descriptions, images, or any other objects) from all the other cities in the US and will be unable to discard useless material at the transport level. Consequently, in the absence of transport-level partitions, it is necessary for a decoder to filter received program guide information at the application level. This is a processor intensive, time-consuming and burdensome task that requires sophisticated software and significant processing power and raises the cost of a decoder unit.

The VLPG data structure of FIG. 1 advantageously provides the option of employing area-based partitioning at the transport layer level. Program guide information may be partitioned in an Eastern area, a Central area, a Mountain area, and a Pacific area, for example. Then a decoder in San Diego would no longer need to receive program guide information from the other 3 regions. Therefore, such partitioning significantly reduces the parsing and filtering burden on a decoder and smaller partitions (e.g. on a state by state basis) further reduce the parsing and filtering burden. Another advantage of such partitioning is that the time involved in downloading applicable partitioned program guide information is reduced.

However, partitioning program guide information involves introducing redundant program guide data because such partitioning requires duplication of data items. As an example, if a basketball game is aired in the Pacific and Mountain regions, then two copies of associated text descriptive information need to be transmitted, one copy for each of the partitions targeted at the pacific and mountain regions. It can be seen that, as the number of partitions increases, the quantity of redundant information also increases necessitating larger transmission bandwidth. Consequently, there is a trade-off between bandwidth and the burden of information filtering. A large number of partitions imply fast information filtering but at the cost of increased bandwidth. When there is only one partition, there are no redundancies and therefore bandwidth is minimal but the filtering burden is larger since all the program guide information items need to be parsed.

Time and area cells may be mapped into an MPEG-2 compatible data structure by using the MPEG2 PSI and DSM-CC fields. Not all of the tables may need to include area-based identifiers. Program content ratings, for example, are typically applicable everywhere in the US. In the VLPG architecture of FIG. 1, significant advantage is obtained by applying area-based partitioning to the Channel Information Table (CIT) and the Master Guide Table. A CIT defines the channel line-up (list of available channels) for a service provider and depends on the geographical area covered by the service provider. The channel line-up for terrestrial broadcast in Indianapolis is different than the channel line-up for a cable provider in Philadelphia, for example. In the system of FIG. 1 the MGT also depends on geographical area but this is not necessarily the case.

The capability of performing focused targeting of program guide information to particular audiences is one advantage derived from being able to make fine area-based divisions of channel line-ups at the broadcast market level. In order to accomplish this, different table "instances" are created. A table instance is a version of a table that is targeted to a particular market area and incorporates an area identifier for identifying the applicable market area. Multiple instances of a single table can be concurrently transmitted each carrying different information. Different table instances are recognized using the "table_id_extension" field of the MPEG-2 protocol.

FIGS. 2 and 3 show a Master Guide Table (MGT) format and Channel Information Table (CIT) format respectively for use in conveying program specific information and incorporating a table_id_extension field for market area identification. In the MGT of FIG. 2 and in the CIT of FIG. 3, this market area identification field is termed a "network_provider" and is shown in the MGT data structure as item 130, and in the CIT data structure as item 140. The network_provider area identifier field is a 16-bit field used to uniquely identify a network provider. The meaning of the network provider depends on the transmission medium. Specifically, for terrestrial broadcast, a network provider is a collection of stations within a geographical region, for cable broadcast, a network provider is a local cable service provider and for satellite broadcast, a network provider is a satellite service provider.

The data structure of FIG. 1 advantageously allows different types of program specific and program guide information to be targeted to different areas. This feature permits flexibility in selecting an acceptable compromise between decoder complexity and processing bandwidth involved in broadcasting and receiving the program guide data. As an example, it may be acceptable to partition multimedia objects into coarser areas than channel line-up information. The data structure of FIG. 1 gives the guide providers the capability of partitioning different types of data in different gradations of area ranging from coarse areas to fine areas (e.g. areas as large as countries, states, or counties ranging to areas as fine as cities, towns, city blocks or even individual customers).

Further, program guide information may be collated in a decoder to provide a User a choice between program guides for different areas (e.g. between two neighboring areas or a choice of guides from any of the available areas) or for different periods of broadcast time. As such, a program guide may be selected in a decoder from one or more available program guides associated with different areas, in response to a User selection input via a remote unit or other data entry device. In performing such a selection, a decoder compares a region identification designation (associated with received program guide information) with a pre-stored region identification designation representing the decoder location. Such a region identification designation may comprise, a zip code, a telephone area code, and any other region identification code.

FIG. 4 shows a multimedia object data structure format for conveying objects within a VLPG. The multimedia object data structure supports area and time based partitioning through the use of area and time identifier fields within an MPEG DSM-CC compatible carouselId identifier (item 150 in FIG. 4).

FIGS. 5, 6 and 7 show examples of the data structure of objects comprising channel, event and control objects respectively. Specifically, FIG. 5 shows a Channel Basic Information File (channel BIF) binary file, FIG. 6 shows an Event Basic Information File (Event BIF) binary file and FIG. 7 shows a Control Basic Information File (Control BIF) binary file. In similar fashion to FIG. 4, the channel, event and control object data of FIGS. 5–7 include area and time identifier fields within MPEG DSM-CC compatible carouselId identifiers (items 153, 157 and 159 of FIGS. 5–7 respectively).

FIG. 8 item 152, shows an exemplary carouselId data structure for an MPEG compatible carouselId (as used in the tables of FIGS. 4, 5, 6 and 7). The carouselId includes a 16 bit directory item identifier for use as a data base reference, an 8 bit time identifier and an 8 bit area identifier. These fields enable a decoder to selectively filter program guide data based on area and time based partitions.

In the VLPG data structure of FIG. 1, a Master Database Table (MDBT item 122) is used to define program guide partitions (cells) and to inform a decoder of the cells available in its location for decoding. FIG. 9 shows a Master Database Table data structure incorporating hierarchical based version identifiers and cell partition identifiers advantageously enabling dynamic program guide re-partitioning. The code between items 170 and 178 comprises a loop that defines partitioned cells. Within this loop, the field called "cell_type" (item 172) determines an index of a cell as illustrated in FIG. 10.

FIG. 10 item 179 shows an exemplary data structure for a cell type indicator. The cell type indicator includes an 8 bit complexity level identifier used to define a complexity level of an object. The cell type indicator also includes an 8 bit area identifier and an 8 bit time identifier for defining area and time based partitions.

An individual object or program guide information item includes a carouselId (as defined in FIG. 8 and as shown item 150 in FIG. 4) for linking the object to a time and area index of its mother cell. Dynamic program guide re-partitioning is achieved by re-arranging the cell list in the MDBT and by dynamic alteration in the mother cell time and area index identifiers within a carouselId. Consequently, a guide provider is able to dynamically re-partition a program guide data structure to adapt to changes in available transmission bandwidth or decoder sophistication. A guide provider may use finer partitions to provide faster object filtering times if increased bandwidth becomes available or may use coarser partitions to preserve bandwidth if decoder processing capabilities improve. As such, a decoder in San Diego may today have access to program guide information associated with areas 0 and 7 while in the future the decoder may be given access to program guide information associated with areas 0 and 9, reflecting finer partitioning, for example. In the future, it is entirely feasible to be able to provide real-time access to multimedia objects present in guides covering areas as large as the USA by selecting an appropriate compromise between bandwidth and partitioning.

Figure 11:
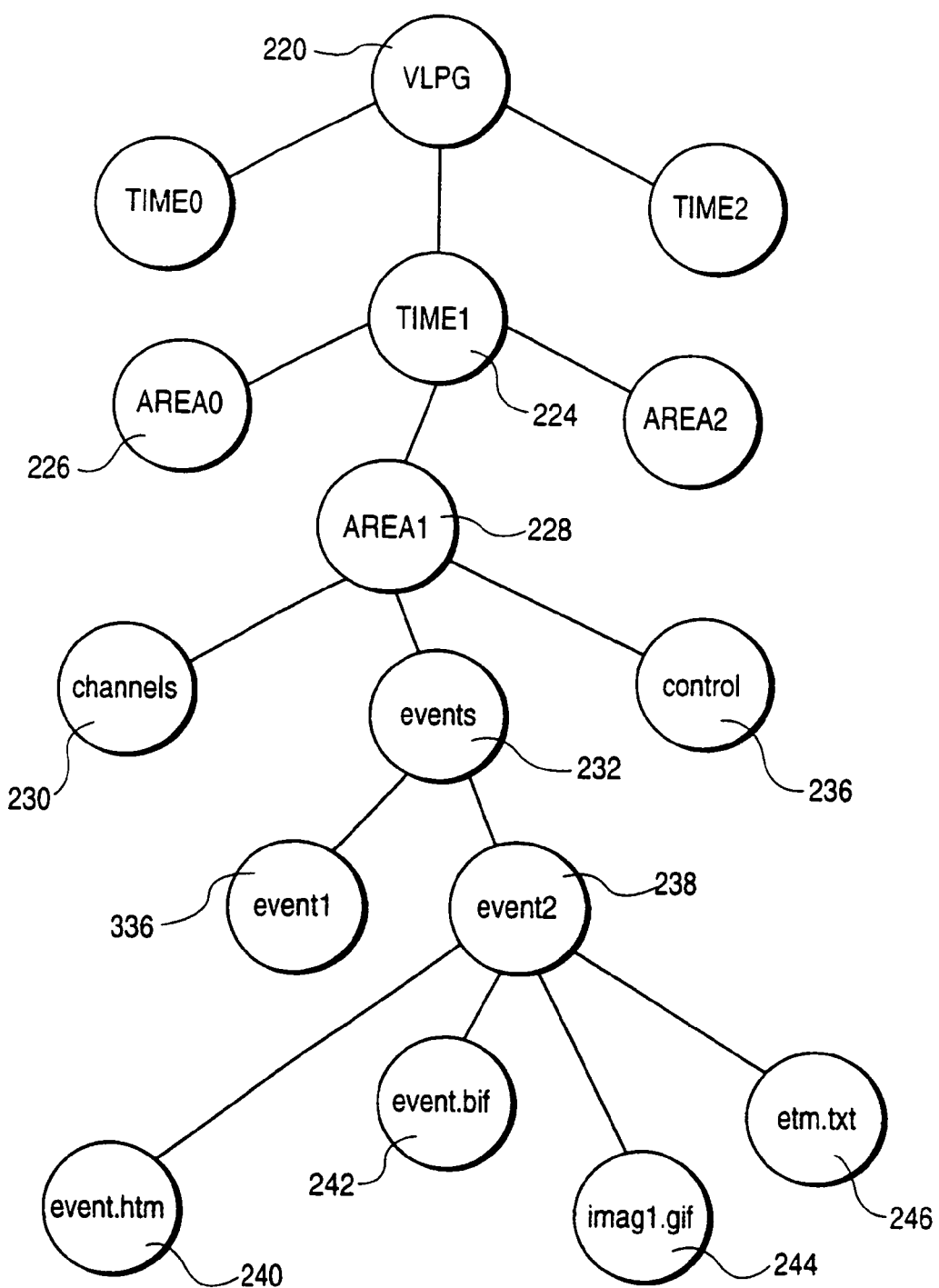
FIG. 11 shows a hierarchical directory format for an object database including channel, event and control subdirectories, according to the invention.

FIG. 11 shows a hierarchical directory format for an object database including object files under channel, event and control sub-directories. FIG. 11 shows that a particular event such as "event2" can have its own directory containing its required files, e.g., "event2" has four associated objects (items 240, 242, 244 and 246 in FIG. 11). Using the object database a directory-based address is mapped into transport-level fields for processing. Given a path such as /VLPG/TIME1/AREA1/events/event2/event.bif, (path through directory items 220, 224, 228, 232, 238, 242 of FIG. 11) for example, there is one and only one object with a certain carouselId and moduleId. For example, in this case, the following mapping applies:

/VLPG--------->Files extracted from VLPG object data base
/TIME1-------->0x01(time variable)
/AREA1--------->0x01(area variable)
/events/event2--->0x3005 (directory number variable).

Therefore, this database address is mapped to a carouselId of 0x01013005. Further, the event.bif (item 242) has a moduleId which may be determined from the program guide information (such as value 0x0002 in this example). The inverse mapping from transport-level fields to a directory-based address is also unique and may be similarly derived.

The directory structure exemplified in FIG. 11 supports the operation of software for processing and interacting with transmitted objects. The processing software may be transmitted in file form, together with objects, and then interpreted or compiled and run by a decoder. Such processing software may be used for numerous applications including for advantageously creating content-based program guides in a decoder in a language such as HTML (Hyper Text Mark-up Language), SGML (Standardized Generalized Mark-up Language), Java, ActiveX and any other decoder supported language. As an example, each Sunday a guide provider may want to prepare a web site describing all available Sunday movies for transmission to decoder units containing a web browser and supporting HTML software. The Sunday guide information is encoded in HTML and transmitted to decoders as HTML software files that describe the special web site. The HTML files are located anywhere in the directory structure of the Object Database and together generate images, text, video, and audio files that form the Sunday movie guide listing comprising the special web site. As such, the Sunday guide web site is broadcast as part of an object database and is not conventionally accessed from an Internet server. Other special program guide web sites that may be conveyed in this way may list, for example, (a) a DVD/VCR programs available for play, (b) other Internet web sites, (c) pre-stored fax/phone numbers for access, (d) videophone functions and (e) home appliance control functions.

A User may initiate display of the special Sunday guide broadcast-web site contained in the Object Database by using a remote unit or other data entry device to select an associated displayed menu item or display icon and may similarly navigate the broadcast-web site and review the advertised movies. In addition, a User may be able to initiate commands via the web site such as (a) programming a VCR or DVD unit, (b) tuning to a desired channel, or (c) accessing other Internet sites that are either similarly broadcast as part of the object database or that are conventionally accessed via telephone (or cable) line. Further, in initiating such telephone (or cable) line Internet access a decoder may acquire access information from a broadcast or other source. Such access information includes (a) an Internet URL, (b) an Internet IP address, (c) an Email address, and (d) a telephone/fax/videophone number, for example.

The hierarchical directory structure of FIG. 11 illustrates another advantage offered by the VLPG structure of FIG. 1. In a large program guide, managing the update of constituent tables and objects involves examining a large quantity of version numbers (thousands of version numbers may be involved). A decoder downloads a particular program guide table or object upon determination of a version number change and disregards those tables or objects where no version number change is indicated. This task may be aided by listing all the version numbers of tables and objects that are susceptible to change in one table such as a MGT. The MGT is broadcast at a sufficiently fast rate to enable a decoder to examine the MGT to determine which tables or objects have changed and to acquire a changed table or object in a timely fashion. However, parsing every entry in the MGT may become very time consuming in a large guide structure.

This problem is addressed by employing a system of hierarchical version control in which there are several tables that perform version control. These tables are arranged in a tree structure as exemplified by FIG. 11. In FIG. 11, table 238 (event2) controls the version of those tables/files under table 238. Table 232 (events) controls all the versions of tables 336 (event1), and 238. Table 228 (AREA1) controls the versions of tables 230 (channels), 232 and 236 (control) only. In this way, the version number information stored in each table is small and by traversing the tree from top to down, it is possible to quickly find those files, tables or objects that need to be updated.

Although a multiple-level structure is described above, a two layer version control structure may also be used for version control of objects in the database in the VLPG of FIG. 1. In the two layer example, the upper layer of the tree hierarchy is the Master Database Table (MDBT) as exemplified in FIG. 9. The second level, below the MDBT level, consist of cells comprising Channel, Event and Control Basic Information Files, as exemplified by the previously described data structures of FIGS. 5, 6 and 7 respectively. A change in any of the Channel, Event or Control files is signaled by a change in their respective version numbers, item 160 (FIG. 5), item 163 (FIG. 6) and item 167 (FIG. 7). Further, any change in the Channel, Event or Control file version numbers is signaled by a change in the next hierarchical (cell) level version number i.e. such a change is signaled by a change in version number 176 in the MDBT of FIG. 9. As a specific example, if a channel logo (which is an image in the database) changes from one version to another, then the channel BIF will reflect this change in item 160 (FIG. 5). The MDBT will also signal the change in item 176 at the cell level (FIG. 9). A decoder examines first the MDBT and determines the cell version number has changed and then examines the BIF files to identify objects that have changed within the cell.

The Master Data Base Table (MDBT) structure of FIG. 9 provides another advantage in processing large program guides. Decoder sophistication and processing power and ability to process complex multimedia objects evolves with time. For example, the first generations of set top box decoders were largely restricted to processing images in bit map form. However, newer generations of decoder may use decompression software to download JPEG, GIF or other image formats and future generations will be able to process not only images but also movie clips in multiple formats. Consequently, it is desirable to structure program guide data to support decoder scalability i.e. to allow a range of decoders of varying complexity to process program guide information using the level of processing power that they are endowed with. Thereby, low-complexity decoders are able to identify objects that they are able to process and to discard objects exceeding their processing capabilities. Otherwise high-complexity objects may impair the operation of low-complexity decoders by causing buffer overflow or other problems.

The MDBT data structure of FIG. 9 (and FIG. 10) advantageously supports efficient multimedia object complexity discrimination in a decoder unit. For this purpose, the MDBT assigns PID (packet identifier) values to cells in the database. In FIG. 9, item 172 identifies a particular cell and is associated with a PID value by item 174. Further, item 172 defines the 24-bit field cell_type that defines the time, area, and complexity coordinates of a cell (see FIG. 10). As such, an object complexity level indicator is included in an MPEG-2 compatible transport-layer field. Thereby objects in the data base belonging to different complexity levels are conveyed in streams identified by different PIDs. A decoder is pre-assigned a complexity level and the decoder applies the MDBT (specifically item 172) in selecting and caching the PID values for those cells with complexity levels that match or are below the pre-assigned decoder complexity level. Objects of complexity level exceeding the decoders capabilities are advantageously discarded at the transport level.

Figure 12:
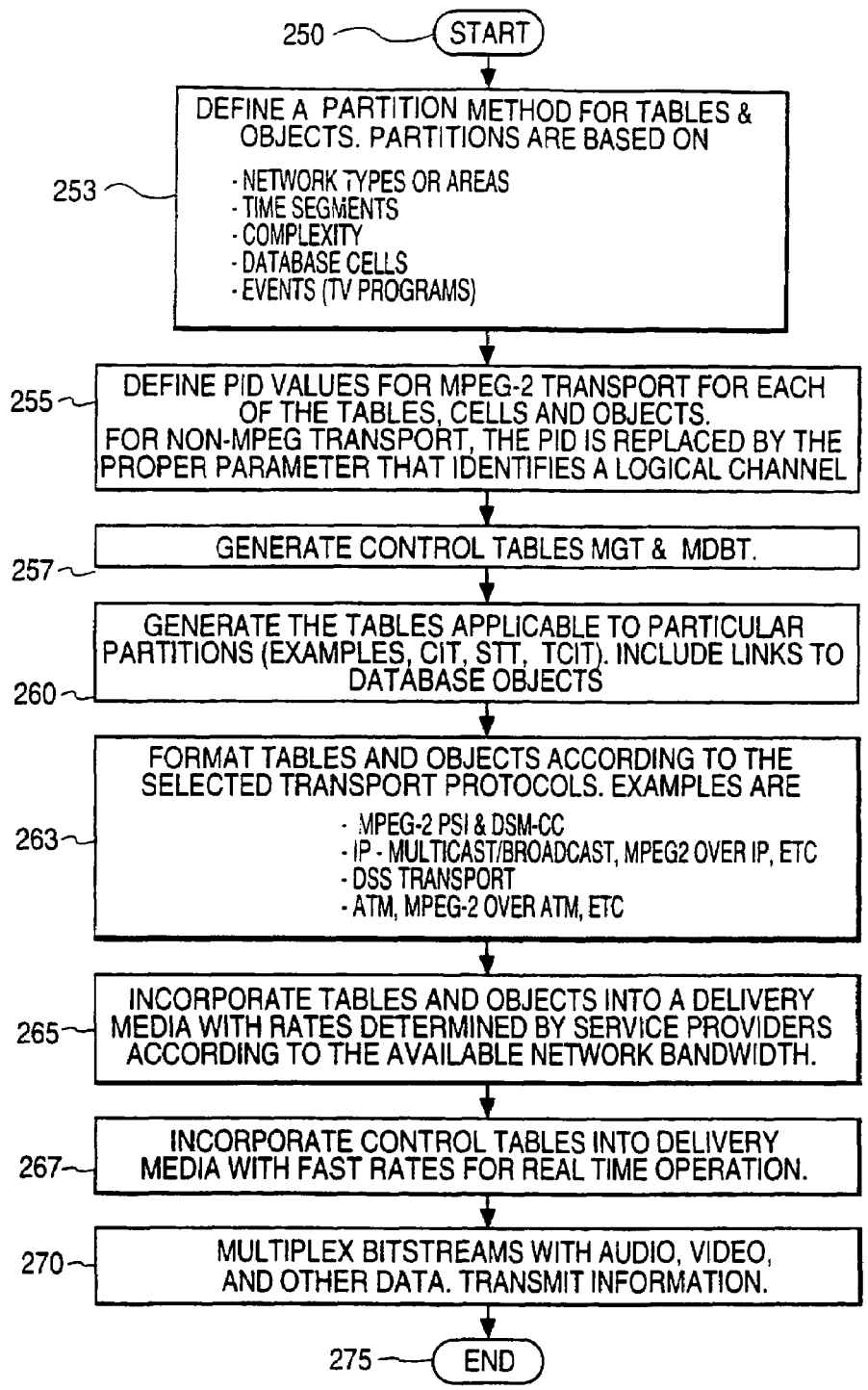
FIG. 12 shows a method for generating program specific information according to the invention.

FIG. 12 shows a flowchart of a method for forming program specific information, according to the invention. The method of FIG. 12 generates program specific information including MGT, MDBT, CCT, STT, RRT, TCIT, CCIT, SCIT and SIT data and descriptors containing the advantageous features previously described. The method may be employed at an encoder for broadcasting program guide data or, may be employed for encoding program guide data within a decoder unit for transmission to another device.

Following the start at step 250 of FIG. 12, in step 253, a method based on the previously described data structuring principles is selected for partitioning program specific information. The program specific information is partitioned in accordance with time segments and areas, network types, complexity levels, cells, and programs (events). In step 255, PID values are assigned to accommodate the partitioned program specific information. If a non-MPEG transport protocol is used, PID values may be replaced by proper parameters that identify logical channels. In step 257 a MGT and MDBT (or other type of control tables) are generated to include those formed during partition operations. The MGT conveys information for use in acquiring program specific information conveyed in other tables. The MDBT conveys information for use in acquiring multimedia objects from a transport stream.

In step 260 individual CCT, STT, RRT, TCIT, CCIT, SCIT and SIT etc. tables are formed complying with the partitioned structure. The individual tables incorporate multimedia object links, version numbers and identifiers derived according to the previously described invention principles. A CIT (e.g. TCIT, CCIT and SCIT) is formed containing channel and program identification information enabling acquisition of available broadcast programs and channels containing packet identifiers for identifying individual packetized datastreams that constitute individual programs to be transmitted on particular channels. Further, in step 260, an SIT is generated containing program guide schedule information including descriptive lists of programs (events) receivable on the channels listed in the CIT.

In step 263, the tables formed in step 260, together with associated multimedia objects, are formatted to be compatible with a desired data format and protocol. Such data formats and protocols include, for example, MPEG2 compatible Program Specific Information, MPEG2 DSM-CC, DSS, and an Internet compatible file transfer format. In step 265, the resulting formatted tables and multimedia objects are incorporated into a datastream in their designated locations for terrestrial transmission. The MGT and MDBT are incorporated into the datastream in step 267.

In step 270, the program specific information produced in step 267, together with video and audio program representative components (and other data) for multiple channels, is multiplexed and formatted into a transport stream for output. In step 270, the output transport stream is further processed to be suitable for terrestrial transmission to another device such as a receiver, video server, or storage device for recording on a storage medium, for example. The processes performed in step 270 include known encoding functions such as data compression Reed-Solomon encoding, interleaving, scrambling, trellis encoding, and carrier modulation. The process is complete and terminates at step 275. In the process of FIG. 12, multiple CIT, SIT and associated extension tables may be formed and incorporated in the program specific information in order to accommodate expanded numbers of channels. Further, in other embodiments the tables may be similarly processed for satellite, cable or Internet transmission, for example.

Figure 13:
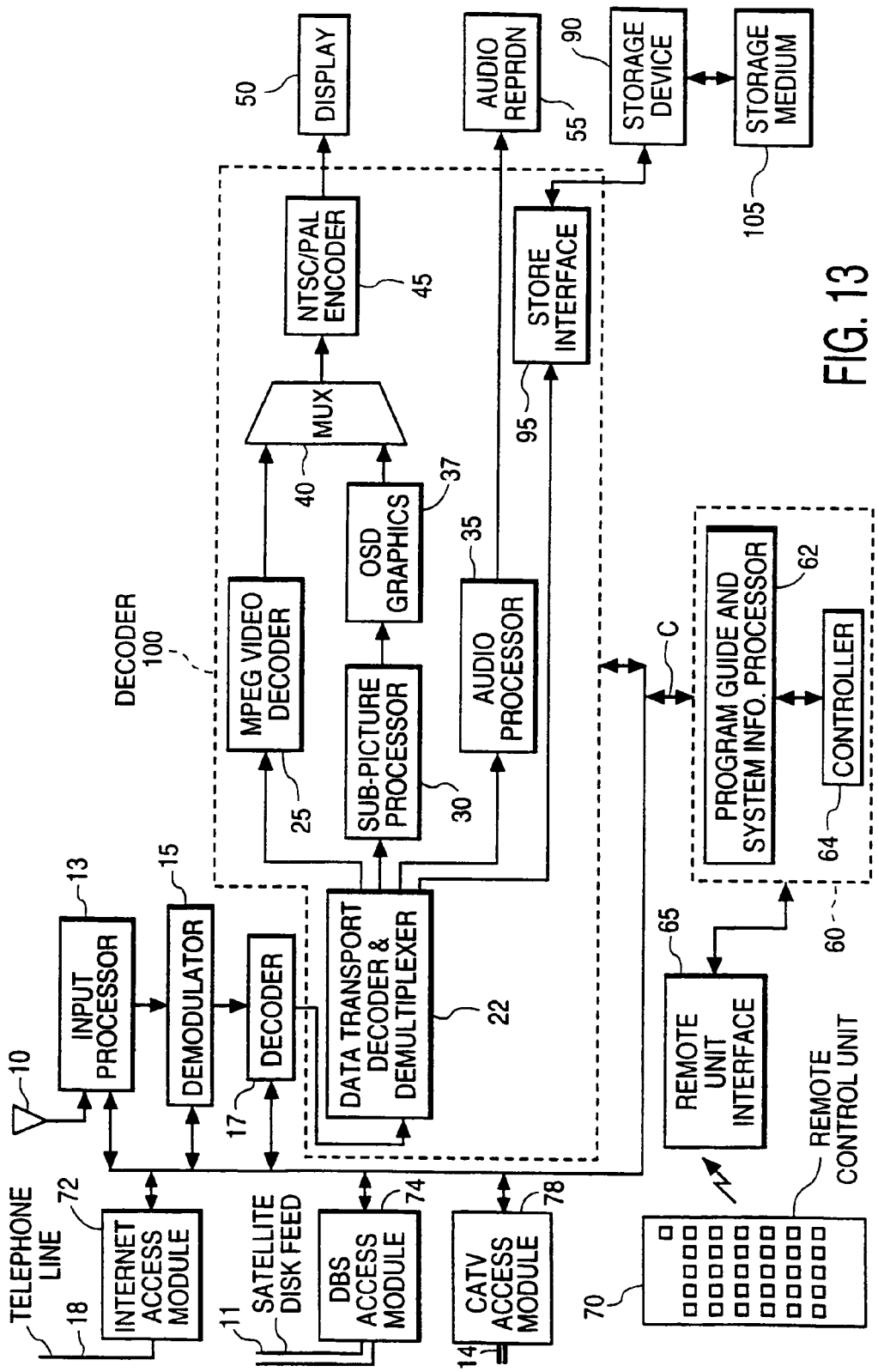
FIG. 13 is a block diagram of digital video receiving apparatus for demodulating and decoding broadcast signals containing VLPG information, according to the principles of the invention.

In the video receiver system of FIG. 13, a broadcast carrier modulated with signals carrying audio, video and associated data representing broadcast program content is received by antenna 10 and processed by unit 13. The resultant digital output signal is demodulated by demodulator 15. The demodulated output from unit 15 is trellis decoded, mapped into byte length data segments, deinterleaved and Reed-Solomon error corrected by decoder 17. The corrected output data from unit 17 is in the form of an MPEG compatible transport datastream containing program representative multiplexed audio, video and data components. The transport stream from unit 17 is demultiplexed into audio, video and data components by unit 22 which are further processed by the other elements of decoder system 100. In one mode, decoder 100 provides MPEG decoded data for display and audio reproduction on units 50 and 55 respectively. In another mode, the transport stream from unit 17 is processed by decoder 100 to provide an MPEG compatible datastream for storage on storage medium 105 via storage device 90.

A user selects for viewing either a TV channel (user selected channel-SC) or an on-screen menu, such as a program guide, by using a remote control unit 70. Controller 60 uses the selection information provided from remote control unit 70 via interface 65 to appropriately configure the elements of FIG. 13 to receive a desired program channel for viewing. Controller 60 comprises processor 62 and processor 64. Unit 62 processes (i.e. parses, collates and assembles) system timing information and program specific information including program guide information. Processor 64 performs the remaining control functions required in operating decoder 100. Although the functions of unit 60 may be implemented as separate elements 62 and 64 as depicted in FIG. 13, they may alternatively be implemented within a single processor. For example, the functions of units 62 and 64 may be incorporated within the programmed instructions of a microprocessor.

Controller 60 configures processor 13, demodulator 15, decoder 17 and decoder system 100 to demodulate and decode the input signal format and coding type. Further, controller 60 configures units 13, 15, and 17 for other communication modes, such as for receiving cable television (CATV) signals and for bi-directional communication via coaxial line 14 or for bi-directional (e.g. Internet) communication, for example, via telephone line 11. In an analog video mode, an NTSC compatible signal is received by units 13, 15 and 17 and processed by decoder 100 for video display and audio reproduction on units 50 and 55 respectively. Units 13, 15, 17 and sub-units within decoder 100 are individually configured for the input signal type by controller 60 setting control register values within these elements using a bi-directional data and control signal bus C.

The transport stream provided to decoder 100 comprises data packets containing program channel data and ancillary system timing information and program specific information including program guide information. Unit 22 directs the ancillary information packets to controller 60 which parses, collates and assembles this information into the previously described hierarchically arranged tables (as exemplified in FIG. 1). Individual data packets comprising the User selected program channel SC are identified and assembled using the assembled program specific information. Further, the program specific information contains conditional access, network information and identification and linking data enabling the system of FIG. 13 to tune to a desired channel and assemble data packets to form complete programs. The program specific information also contains data supporting the identification and assembly of the ancillary information.

The program specific and system timing information is assembled by controller 60 into multiple hierarchically arranged and inter-linked tables per the structure of FIG. 1. The STT contains a time reference indicator and associated correction data sufficient for a decoder to establish a time of transmission of a program by a broadcast source. The MGT contains information for acquiring program specific information conveyed in other tables such as identifiers for identifying data packets associated with the other tables. The CIT (e.g. TCIT) contains information for tuning and navigation to receive a User selected program channel. The SIT contains descriptive lists of programs (events) receivable on the channels listed in the CIT. The RRT contains program content rating information such as the MPAA (Motion Picture Association of America) or V-chip compatible rating information that is collated by region (e.g. by country or by state within the USA). Additional program specific information describing and supplementing items within the hierarchical tables is conveyed within descriptor information elements. The program specific and system timing information acquired by controller 60 via unit 22 is stored within internal memory of unit 60. Controller 60 uses the acquired program guide information in conditioning access to programs and in scheduling program processing functions including program viewing, recording and playback.

Controller 60 and processor 22 determine from the CIT the PIDs of video, audio and sub-picture streams in the packetized decoded transport stream input to decoder 100 from unit 17. The video, audio and sub-picture streams constitute the desired program being transmitted on selected channel SC. Processor 22 provides MPEG compatible video, audio and sub-picture streams to video decoder 25, audio decoder 35 and sub-picture processor 30 respectively. The video and audio streams contain compressed video and audio data representing the selected channel 9C program content. The sub-picture data contains the SIT, CCT and RRT information associated with the channel SC program content.

Decoder 25 decodes and decompresses the MPEG compatible packetized video data from unit 22 and provides decompressed program representative pixel data to NTSC encoder 45 via multiplexer 40. Similarly, audio processor 35 decodes the packetized audio data from unit 22 and provides decoded and amplified audio data, synchronized with the associated decompressed video data, to device 55 for audio reproduction. Processor 30 decodes and decompresses sub-picture data received from unit 22.

Processor 30 assembles, collates and interprets RRT, CCT, CIT and data objects from unit 22 to produce formatted program guide data for output to OSD 37. OSD 37 processes the SIT, RRT, and CCT and other information to generate pixel mapped data representing subtitling, control and information menu displays including selectable menu options and other items for presentation on the display device 50. The control and information menus that are displayed enable a user to select a program to view and to schedule future program processing functions including a) tuning to receive a selected program for viewing, b) recording of a program onto storage medium 105, and c) playback of a program from medium 105.

The control and information displays, including text and graphics produced by OSD generator 37, are generated in the form of overlay pixel map data under direction of controller 60. The overlay pixel map data from unit 37 is combined and synchronized with the decompressed pixel representative data from MPEG decoder 25 in encoder 45 via multiplexer 40 under direction of controller 60. Combined pixel map data representing a video program on channel SC together with associated sub-picture data is encoded by NTSC encoder 45 and output to device 50 for display.

In a storage mode of the system of FIG. 13, the corrected output data from unit 17 is processed by decoder 100 to provide an MPEG compatible datastream for storage. In this mode, a program is selected for storage by a user via remote unit 70 and interface 65. Processor 22, in conjunction with processor 60 forms condensed program specific information including MGT, MDBT, CCT, STT, RRT, TCIT and SIT data and descriptors containing the advantageous features previously described. The condensed program specific information supports decoding of the program selected for storage but excludes unrelated information. Processor 60, in conjunction with processor 22 forms a composite MPEG compatible datastream containing packetized content data of the selected program and associated condensed program specific information. The composite datastream is output to storage interface 95.

Storage interface 95 buffers the composite datastream to reduce gaps and bit rate variation in the data. The resultant buffered data is processed by storage device 90 to be suitable for storage on medium 105. Storage device 90 encodes the buffered datastream from interface 95 using known error encoding techniques such as channel coding, interleaving and Reed Solomon encoding to produce an encoded datastream suitable for storage. Unit 90 stores the resultant encoded datastream incorporating the condensed program specific information on medium 105.

The architecture of FIG. 13 is not exclusive. Other architectures may be derived in accordance with the principles of the invention to accomplish the same objectives. Further, the functions of the elements of decoder 100 of FIG. 13 and the process steps of FIG. 12 may be implemented in whole or in part within the programmed instructions of a microprocessor. In addition, the principles of the invention apply to any form of MPEG or non-MPEG compatible electronic program guide. A datastream formed according to the invention principles may be used in a variety of applications including video server or PC type communication via telephone lines, for example. A program datastream with one or more components of video, audio and data formed to incorporate program Specific information according to invention principles may be recorded on a storage medium and transmitted or re-broadcast to other servers, PCs or receivers. The key elements of the data structure described herein may be advantageously used for conveying program ancillary information in a wide variety of data transport structures that may be used to deliver program content or program guide information. Such transport structures, for example, may include MPEG-PSI, Internet TCP/IP (Transport Control Protocol/Internet Protocol), DSS (Digital Satellite System), ATM (Asynchronous Transfer Mode) etc.

What is claimed is:

1. Apparatus for decoding packetized program data from at least a first source to provide a program guide, comprising:
    a processor for acquiring program guide information and for acquiring ancillary information in said packetized program data, said ancillary information including,
        (a) a directory of executable software application files associated with objects, and
        (b) a non-displayed map for associating an object with a program guide information item;
    a processor for executing a software application to create an object and linking said object to a program guide information item; and
    a display processor for forming a composite image including said image object and said program guide information item to provide a program guide for display.

2. Apparatus according to claim 1, wherein said directory of executable software application files lists a file associated with at least one of (a) a broadcast program, (b) a broadcast channel and (c) User interface controls.

3. Apparatus according to claim 1, wherein an object comprises at least one of (a) a video segment, (b) an audio segment, (c) text, (d) an icon representing a user selectable item for display, (e) an HTML or SGML document (f) a menu of selectable items, (g) an image window for presentation within an encompassing image, and (h) an image window for initiating a multimedia function.

4. Apparatus according to claim 1, wherein said ancillary information further includes acquisition information for use in acquiring said ancillary information from a second source different to said first source, and
    said acquisition information includes one of (a) an Internet URL, (b) an Internet IP address, (c) an Email address, and (d) a telephone/fax/videophone number.

5. Apparatus according to claim 1, wherein said display processor provides said program guide for display in response to a User selection input command selecting between available program guides.

6. Apparatus according to claim 1, wherein said ancillary information includes an object complexity level indicator, and said apparatus disregards objects of complexity level exceeding a predetermined level.

7. Apparatus for decoding packetized program data from at least a first source, comprising:
    a processor for acquiring packetized program information including ancillary information and program guide information, said ancillary information including,
        (a) an object file comprising application software for use in commanding a device, and
        (b) a directory for associating said application software with a program listed in said program guide information; and
    a processor using said ancillary information and for executing said application software to command said device in processing said listed program.

8. Apparatus according to claim 7, wherein said application software performs at least one of the following functions, (a) commands a VCR/DVD device to record a program at a scheduled broadcast time, (b) commands said apparatus to tune to a particular broadcast video channel, (c) commands said apparatus to tune to a particular broadcast audio channel.

9. Apparatus according to claim 7, wherein said application software comprises at least one of, (a) an HTML or SGML file, (b) a Java™ file, (c) an ActiveX™ file, (d) a web browser and (e) a decoder supported software language file.

10. Apparatus according to claim 7, wherein said directory lists a file associated with at least one of (a) a broadcast program, (b) a broadcast channel, (c) User interface controls, and (d) a peripheral device attached to said apparatus.

11. Apparatus according to claim 7, wherein said ancillary information includes an object file complexity level indicator, and said apparatus disregards object files of complexity level exceeding a predetermined level.

12. Apparatus for decoding packetized program data from at least a first source to provide a program guide, comprising:
    a processor for acquiring program guide information and for acquiring ancillary information in said packetized program data, said ancillary information including,
        (a) a directory of object files associated with program guide information items, and
        (b) an object file decoding complexity level indicator, and
    a processor for disregarding object files of complexity level exceeding a predetermined level and for creating an image object from an object file and linking said image object to a program guide information item; and a display processor for forming a composite image including said image object and said program guide information item to provide a program guide for display.

13. A method for decoding packetized program data from at least a first source to provide a program guide, comprising the steps of:
    acquiring program guide information and for acquiring ancillary information in said packetized program data, said ancillary information including,
        (a) a directory of executable software application files associated with objects, and
        (b) a non-displayed map for associating an object with a program guide information item; and
    executing a software application to create an object;
    linking said image object to a program guide information item; and
    forming a composite image including said image object and said program guide information item to provide a program guide for display.

14. A method for decoding packetized program data from at least a first source, comprising the steps of:
    acquiring packetized program information including ancillary information and program guide information, said ancillary information including,
        (a) an object file comprising application software for use in commanding a device, and
        (b) a directory for associating said application software with a program listed in said program guide information; and
    using said ancillary information to determine a program for processing by a device; and
    executing said application software to command said device in processing said listed program.

15. A method for forming packetized program data to be suitable for processing in a decoder, comprising the steps of:
    forming program guide information and ancillary information including,
        (a) a directory of object files associated with program guide information items, and
        (b) a non-displayed map for associating said object files with said program guide information items;
    incorporating said ancillary information and said program guide information into packetized data for output to a transmission channel.

* * * * *